(12) United States Patent
Inoue et al.

(10) Patent No.: US 7,518,658 B2
(45) Date of Patent: *Apr. 14, 2009

(54) RECEIVING APPARATUS

(75) Inventors: Kenji Inoue, Kanagawa (JP); Takashi Tsunoda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 329 days.

This patent is subject to a terminal disclaimer.

(21) Appl. No.: 11/420,340

(22) Filed: May 25, 2006

(65) Prior Publication Data

US 2006/0203130 A1     Sep. 14, 2006

Related U.S. Application Data

(62) Division of application No. 10/401,578, filed on Mar. 31, 2003, now Pat. No. 7,113,224.

(30) Foreign Application Priority Data

Apr. 5, 2002     (JP)     ............................. 2002-103935

(51) Int. Cl.
    *H04N 5/45*     (2006.01)
(52) U.S. Cl. ...................................... 348/565
(58) Field of Classification Search ................ 348/565, 348/564, 462, 706, 705, 485, 484
    See application file for complete search history.

(56) References Cited

U.S. PATENT DOCUMENTS

| 4,903,129 | A |   | 2/1990 | Bell et al. ................... 358/181 |
| 5,237,418 | A |   | 8/1993 | Kaneko ...................... 358/183 |
| 5,442,452 | A | * | 8/1995 | Ryu ............................ 386/97 |
| 5,602,598 | A |   | 2/1997 | Shintani ..................... 348/565 |
| 5,666,555 | A |   | 9/1997 | Okazaki et al. ............. 395/807 |
| 7,113,224 | B2 | * | 9/2006 | Inoue et al. ................. 348/565 |
| 2002/0167503 | A1 |   | 11/2002 | Tsunoda et al. ............. 345/204 |

FOREIGN PATENT DOCUMENTS

| JP | 57-097784  | 6/1982 |
| JP | 62-272679  | 11/1987 |
| JP | 3-186076   | 8/1991 |
| JP | 04-282980  | 10/1992 |
| JP | 5-113864   | 5/1993 |
| JP | 2001-125695| 5/2001 |

* cited by examiner

*Primary Examiner*—M. Lee
(74) *Attorney, Agent, or Firm*—Fitzpatrick, Cella, Harper & Scinto

(57) ABSTRACT

A television broadcast receiving apparatus which displays one of television programs received by two tuners on a main picture screen and displays the other on a child picture screen, where one of audios of a program of the main picture screen and a program of the child picture screen is selected and outputted, and the state of an audio signal to be outputted is switched according to the audio state of the program of the child picture screen.

4 Claims, 6 Drawing Sheets

RECEIVING APPARATUS

This application is a division of application Ser. No. 10/401,578 filed on Mar. 31, 2003 now U.S. Pat. No. 7,113,224.

BACKGROUND OF THE INVENTION

1. Field of the Invention

The present invention relates to a receiving apparatus which receives a television broadcast.

2. Related Background Art

In recent years, according to a start of CS digital broadcast or BS digital broadcast, multi-channeling of television broadcast has been advanced. According to such a multi-channeling, attention is paid to a multi-picture screen display function serving to display a plurality of television programs on a large-sized screen of a television broadcast receiving apparatus.

A problem rising when multi-picture screen displaying is performed is one regarding audio. That is, even if audios of respective programs are outputted simultaneously while the multi-picture screen is being displayed, it is difficult to recognize respective audios. Therefore, it is common to select one of audios of a plurality of programs which are being displayed in a multi-picture screen manner, and output it.

Further, as one displaying aspect of multi-picture screen displaying, there is a technique that one of a plurality of programs being displayed simultaneously is displayed largely as a main picture screen and the remaining programs are displayed as child picture screens. In this case, when a constitution is employed that the audio of one program is selected and outputted like the above, only the audio corresponding to the main picture screen is outputted, but the audios corresponding to the child picture screens are not outputted.

At this time, it is possible according to an instruction of a user to perform switching between a program of the main picture screen and a program of one of the child picture screens or perform switching only in audio between the program of the main picture screen and the program of the one of the child picture screens.

Techniques for selectively switching audios while performing a multi-picture screen displaying in this manner have been disclosed in JP-A-05-113864 (corresponding to U.S. Pat. No. 5,666,555) and the like.

Further, according to advance in a recent resolution conversion technique, it becomes possible to change according to a user's preference a size of a displayed screen of a program watched or a ratio of sizes of respective picture screens when a multi-picture screen is displayed. In this case, it is inconvenient to control the picture screen size and the volume independently from each other. In view of this, in JP-A-03-186076, there is disclosed a technique for changing a picture screen size and a volume in linkage with each other.

Thus, it is possible to perform by a user operation such an operation as switching between a main picture screen and one of child picture screens or changing a picture screen size when a multi-picture screen is displayed.

However, in case that a user is watching a multi-picture screen, such a case often occurs that he/she does not notice a decisive scene or an important scene of a child picture screen program (program on different channel), because he/she generally pays attention mostly to a main picture screen. Therefore, there is a problem that a user does not perform switching between the main picture screen and one of the child picture screens, and thus overlooks an interesting scene of the child picture screen program.

SUMMARY OF THE INVENTION

An object of the present invention is to solve such a problem as described above.

Another object of the invention is to prevent a user from overlooking an interesting scene on a child picture screen program at a time of a multi-picture screen displaying.

A still another object of the invention is to detect an interesting scene on a program on a different channel and notice the detected scene to a user, thereby preventing him/her from overlooking the interesting scene on the program on a different channel.

In order to achieve the above objects, according to one aspect of the present invention, there is provided a television broadcast receiving apparatus comprising: first receiving means for receiving a television broadcast; second receiving means for receiving the television broadcast; image outputting means for producing a main picture screen by using image data of a broadcast program received by one of the first receiving means and the second receiving means, producing a child picture screen by using image data of a broadcast program received by the other of the first receiving means and the second receiving means, and producing display picture screen data comprising the main picture screen and the child picture screen to output the display picture screen data to a display device; audio output means for selecting one of audio data of the broadcast program of the main picture screen and audio data of the broadcast program of the child picture screen to output the selected audio data to a speaker unit; and control means for controlling a selection operation of the audio output means in accordance with the state of audio of the broadcast program of the child picture screen.

Objects and features other than the above of the invention will be apparent from the following detailed explanation of embodiments referring to the drawings.

DESCRIPTION OF THE PREFERRED EMBODIMENTS

Embodiments of the present invention will be explained below.

Figure 1:
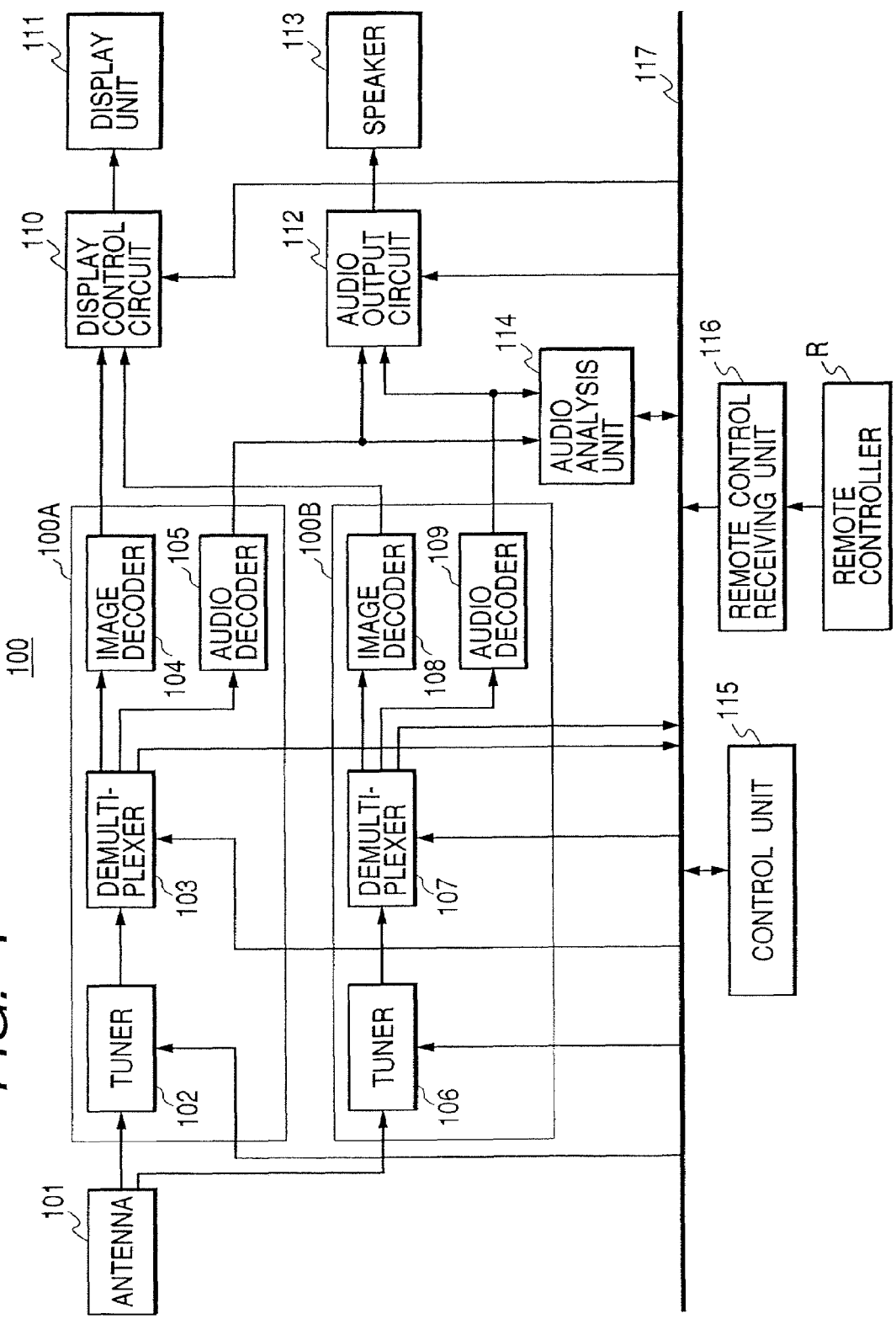
FIG. 1 is a block diagram showing a configuration of a television set to which the present invention is applied.

FIG. 1 is a diagram showing a configuration of a digital television set 100 to which the present invention is applied. The television set shown in FIG. 1 is provided with two receiving units, each of which can process digital television broadcast data of one channel, so that it can receive broadcast programs of two channels simultaneously.

First, an ordinary one channel receiving processing in the television set shown in FIG. 1 will be explained.

When a user designates a receiving channel by operating a remote controller R, a remote control receiving unit 116 receives a command from the remote controller R, to send the command to a control unit 115 via a bus 117. The control unit 115 actuates only a tuner 102 in an ordinary receiving mode, and the tuner 102 receives a broadcast signal including a designated channel from digital television broadcasts outputted from an antenna 101 to convert the broadcast signal to a data sequence of MPEG 2 Transport Stream (TS) format and output the same to a demultiplexer 103.

The demultiplexer 103 extracts PSI (Program Specific Information) having a predetermined packet ID such as a PAT (Program Association Table) and PMT (Program Map Table) from the MPEG2-TS to output the extracted PSI to a control unit 115. The control unit 115 detects packet IDs of image data and audio data of a channel (or program) designated on the basis of such a PSI to output them to the demultiplexer 103.

The demultiplexer 103 detects the image data and the audio data of the program designated on the basis of these packet IDs to output the image data to an image decoder 104 and output the audio data to an audio decoder 105. The image decoder 104 decodes coded image data from the demultiplexer 103 to be converted into original image data 104a and outputs the same to a display control circuit 110. Further, the audio decoder 105 decodes coded audio data from the demultiplexer 103 to be converted into original audio data 105a and outputs the same to an audio output circuit 112.

The display control circuit 110 produces, in the ordinary receiving mode, image data for display on the basis of the image data 104a outputted from the image decoder 104 under control of the control unit 115 to output the same to a display unit 111. Further, the audio output circuit 112 outputs the audio data 105a from the audio decoder 105 to a speaker 113 under control of the control unit 115. Thus, in the ordinary receiving mode, an image corresponding to a broadcast program of a designated channel is displayed on the display unit 111 and audio is outputted from the speaker 113.

In the television set in FIG. 1, the tuner 102, the demultiplexer 103, the image decoder 104 and the audio decoder 105 constitute a first receiving section 100A.

Next, operation at a time of a two-picture screen display mode will be explained. In the two-picture screen display mode, a second receiving section 100B comprising a tuner 106, a demultiplexer 107, an image decoder 108 and an audio decoder 109 is also used in addition to the first receiving section 100A. A function of the second receiving section 100B is similar to that of the first receiving section 100A, and the first receiving section 100A and the second receiving section 100B can receive broadcast programs of different channels simultaneously.

When a user operates the remote controller R to set the two-picture screen display mode, a remote control receiving unit 116 outputs a two-picture screen display command to the control unit 115. The control unit 115 controls the tuners 102, 106 and demultiplexers 103, 107 according to the two-picture screen display command such that a program to be displayed as a main picture screen is received in the first receiving section 100A and a program to be displayed as a child picture screen is received in the second receiving section 100B.

A channel to be displayed as the main picture screen and a channel to be displayed as the child picture screen can arbitrarily be designated by a user by operating the remote controller R.

The image data 104a of the main picture screen program and the image data 108b of the child picture screen program are respectively outputted from the image decoders 104 and 108 to the display control circuit 110, and the audio data 105a of the main picture screen program and the audio data 109a of the child picture screen program are respectively outputted from the audio decoders 105 and 109 to the audio output circuit 112. Furthermore, in the two-picture screen display mode, the audio data 105a from the audio decoder 105 and the audio data 109a from the audio decoder 109 are also outputted to an audio analysis unit 114.

The display control circuit 110 adjusts sizes of the image data of the main picture screen program and the image data of the child picture screen program to compose them according to an instruction from the control unit 115, thereby producing display data.

Incidentally, in this embodiment, it is possible to switch between the main picture screen program and the child picture screen program by operating the remote controller R. Upon receipt of this switching instruction, the control unit 115 controls the display control circuit 110 such that the program of the main picture screen and the child picture screen which are currently being displayed are switched therebetween to be displayed.

On the other hand, the audio output circuit 112 selects one of the audio data 105a from the audio decoder 105 and the audio data 109a from the audio decoder 109 to output the selected one to the speaker 113 according to an instruction from the control unit 115.

Next, a selection processing of the audio data conducted by the control unit 115 will be explained.

In the two-picture screen display mode, on the basis of the analysis result obtained from the audio analysis unit 114, the control unit 115 selects the audio data of the child picture screen program in a case that the state of the audio of the child picture screen program coincides with a set condition, and selects the audio data of the main picture screen program in the other cases.

That is, for example, in a case that the audio data 105a from the audio decoder 105 is the audio of the main picture screen program and the audio data 109a from the audio decoder 109 is the audio of the child picture screen program, the control unit 115 performs control the audio analysis unit 114 so as to analyze the state of the audio data 109a. The audio analysis unit 114 analyzes designated audio data, here, the audio data 109a, using a process such as a frequency resolution or the like, to output information indicating whether or not the state of the audio data 109a corresponds to the set condition to the control unit 115, as described later.

The control unit 115 controls the audio output circuit 112 on the basis of the analysis result so as to select the audio data 109a which is the audio data of the child picture screen program to output the same only when the state of the audio data 109a corresponds to the set condition, while selecting the audio data 105a which is the audio data of the main picture screen program, to output the same in the other cases.

Furthermore, only the audio data items are switched at this time, but the main picture screen program and the child picture screen program are not changed on display picture screen, so that the display picture screen remains as it is.

Figure 2:
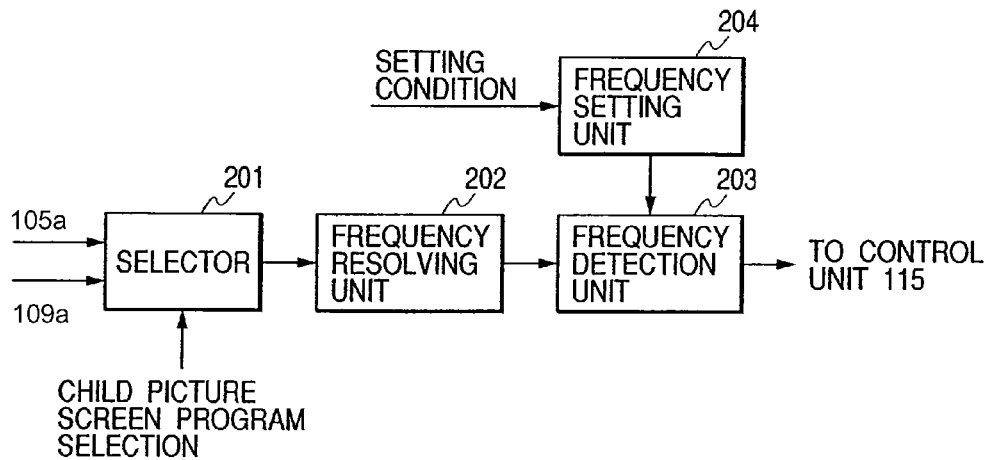
FIG. 2 is a block diagram showing a configuration of an audio analysis unit.

FIG. 2 is a block diagram showing a configuration of the audio analysis unit 114.

In FIG. 2, the audio data 104a, 109a from the audio decoders 105, 109 are outputted to a selector 201, and the selector 201 selects the audio data of the child picture screen in accordance with a control signal from the control unit 115 to output the same to a frequency resolving unit 202. The frequency resolving unit 202 resolves the inputted audio data to respective frequencies to output them to a frequency detection unit 203. The frequency detection unit 203 monitors an audio data level of a frequency set by a frequency setting unit 204 of audio data of the respective frequencies, and it outputs a signal indicating that the audio level exceeds a predetermined level to the control unit 115 via the bus 117 when this fact happens.

Here, a frequency band set by the frequency setting unit 204 can be arbitrarily set by a user. In this embodiment, such a constitution is employed that the frequency band is not set by inputting such a numerical value such as from MHz, but a user selects the frequency band from some frequency bands prepared in advance.

Figure 3:
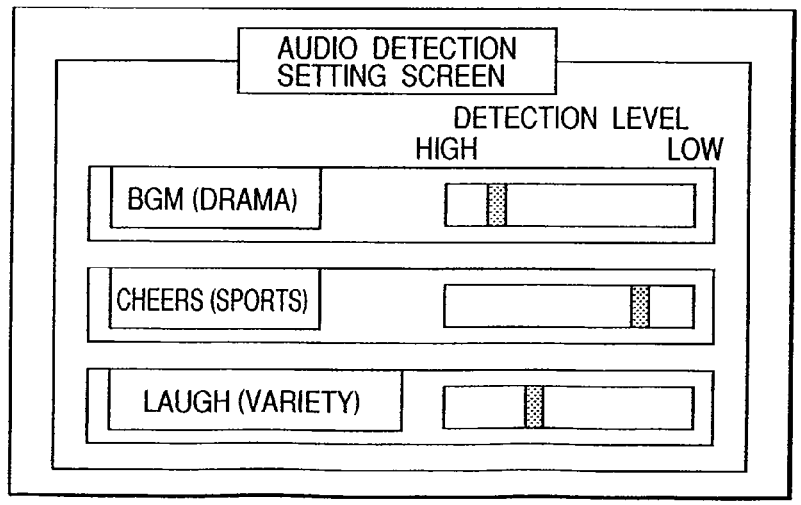
FIG. 3 is a diagram showing a set picture screen of detection conditions conducted by the audio analysis unit.

When the frequency setting is instructed using a menu function through the remote controller R, the control unit 115 produces a setting screen as shown in FIG. 3 to display the screen on the display unit 111 through the display control circuit 110.

In the example shown in FIG. 3, regarding three predicted program genres, an icon showing plural audio kinds detectable in each genre is displayed, and a user selects the audio kind to be detected in each genre by operating the remote controller R. In this embodiment, frequency bands corresponding to these respective kinds of audio are set, and a frequency band corresponding to the kind of the selected audio is set by the frequency setting unit 204 shown in FIG. 2.

Further, a bar for adjusting a detection level of each audio is displayed on the right side on the screen, and a user can set the detection level of each audio by moving the bar using the remote controller R. The detection level set here is also transmitted to the frequency setting unit 204 shown in FIG. 2 as a setting condition, and the frequency detection unit 203 compares the set level and the audio level transmitted from the frequency resolving unit 202 with each other to output the comparison result.

Figure 4:
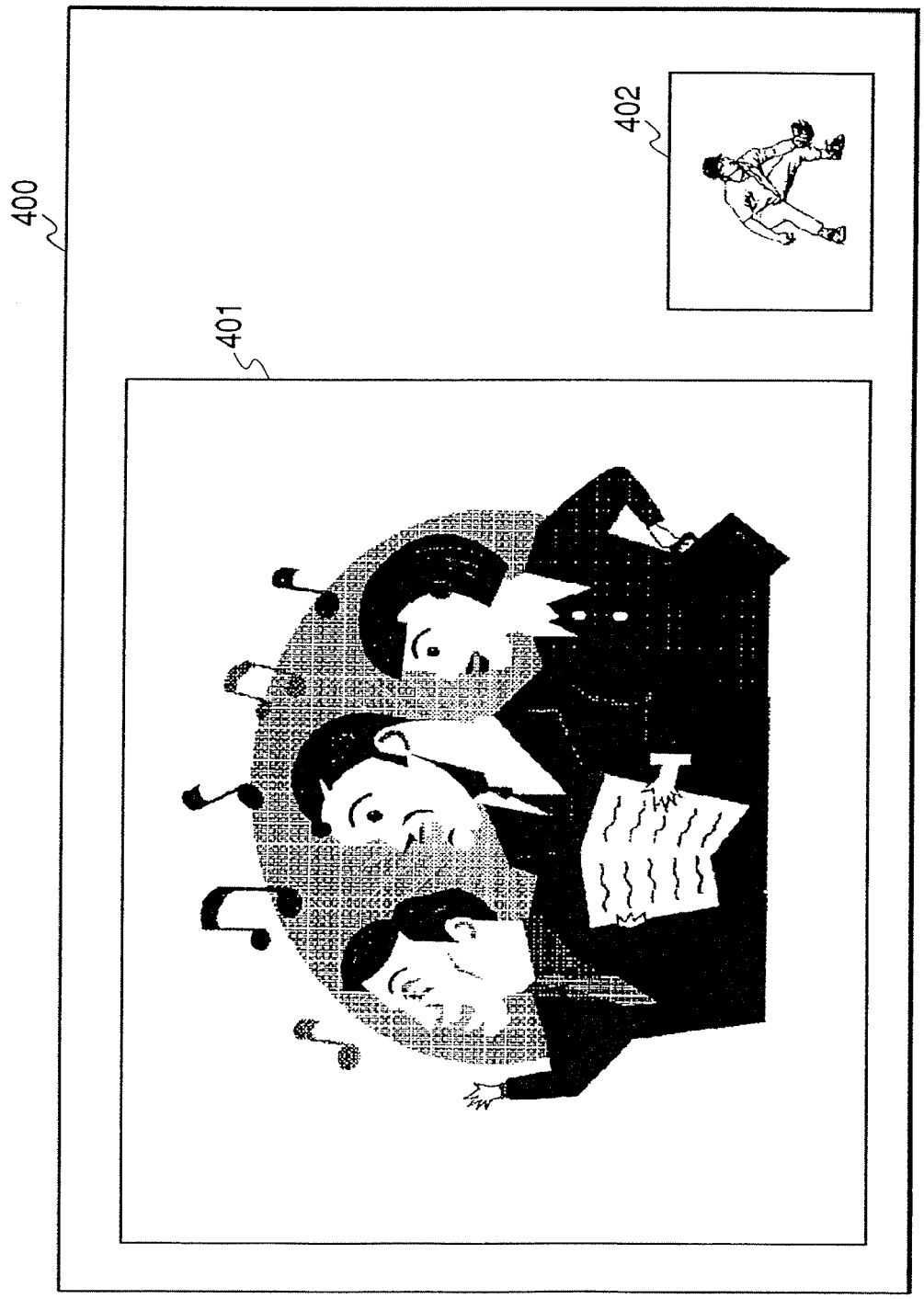
FIG. 4 is a diagram showing a display picture screen in a two-picture screen display mode.

FIG. 4 is a diagram showing an example of a display picture screen 400 in a two-picture screen display mode.

A user pays attention to a program of a main picture screen 401 to watch it. Reference numeral 402 denotes a child picture screen. In this state, the audio analysis unit 114 is analyzing the audio data of the child picture screen 402. Here, in the condition setting screen shown in FIG. 3, in case that CHEERS in sports genre is selected as the kind of audio, when the program in the child picture screen 402 is a relay broadcasting of a baseball game and a shot of joy of audience exceeds the set level, the audio analysis unit 114 outputs the analysis result indicating this fact to the control unit 115.

The control unit 115 controls the audio output circuit 112 in accordance with the analysis result so as to select the audio data of the child picture screen 402 while the shot of goes up and output the audio to the speaker 113.

According to such a processing, when a shot of joy in the child picture screen program goes up, the audio output from the speaker 113 is automatically switched from the audio of the main picture screen program to the child picture screen program while maintaining the display form in the display unit 111, so that a user can recognize an interesting scene in the child picture screen program.

When the user wishes to confirm the interesting scene with a larger size, he/she can switch the main picture screen program and the child picture screen program to display the child picture screen program by operating the remote controller R. Further, when the main picture screen and the child picture screen are not switched to each other and the shot of joy becomes smaller than the set audio level, the audio outputted from the speaker 113 is switched from the audio of the child picture screen program to the audio of the main picture screen program, again.

Incidentally, when the instruction to switch between the main picture screen and the child picture screen is issued in this manner, the control unit 115 notifies the audio analysis unit 114 of the fact of switching, so that audio data to be analyzed are switched in the audio analysis unit 114.

Thus, according to the present embodiment, the audio of the child picture screen program in the two-picture screen mode is being monitored and, when the state of the audio of the child picture screen program coincides with the set condition, the audio outputted from the speaker is switched from the main picture screen program to the child picture screen program, so that a user can easily recognize an interesting scene in the child picture screen program.

Incidentally, in this embodiment, the case that output audio is automatically selected in accordance with the state of the audio of the child picture screen program is explained. However, it is possible to select only audio outputted from the speaker 113 in accordance with a user's instruction without changing the state of the display screen. Furthermore, it is also possible to conduct setting in accordance with the menu function of the remote controller R so as to always output only the audio of the main picture screen program without automatically switching audios like the above.

In addition, in this embodiment, the audios to be outputted from the speaker 113 are switched in response to the output of the audio analysis unit 114. However, it is possible to display a frame 403 in the child picture screen 402 as shown in FIG. 5 to blink the frame 403 while maintaining the audio as it is, thereby notifying a user that the child picture screen is displaying an interesting scene.

Figure 5:
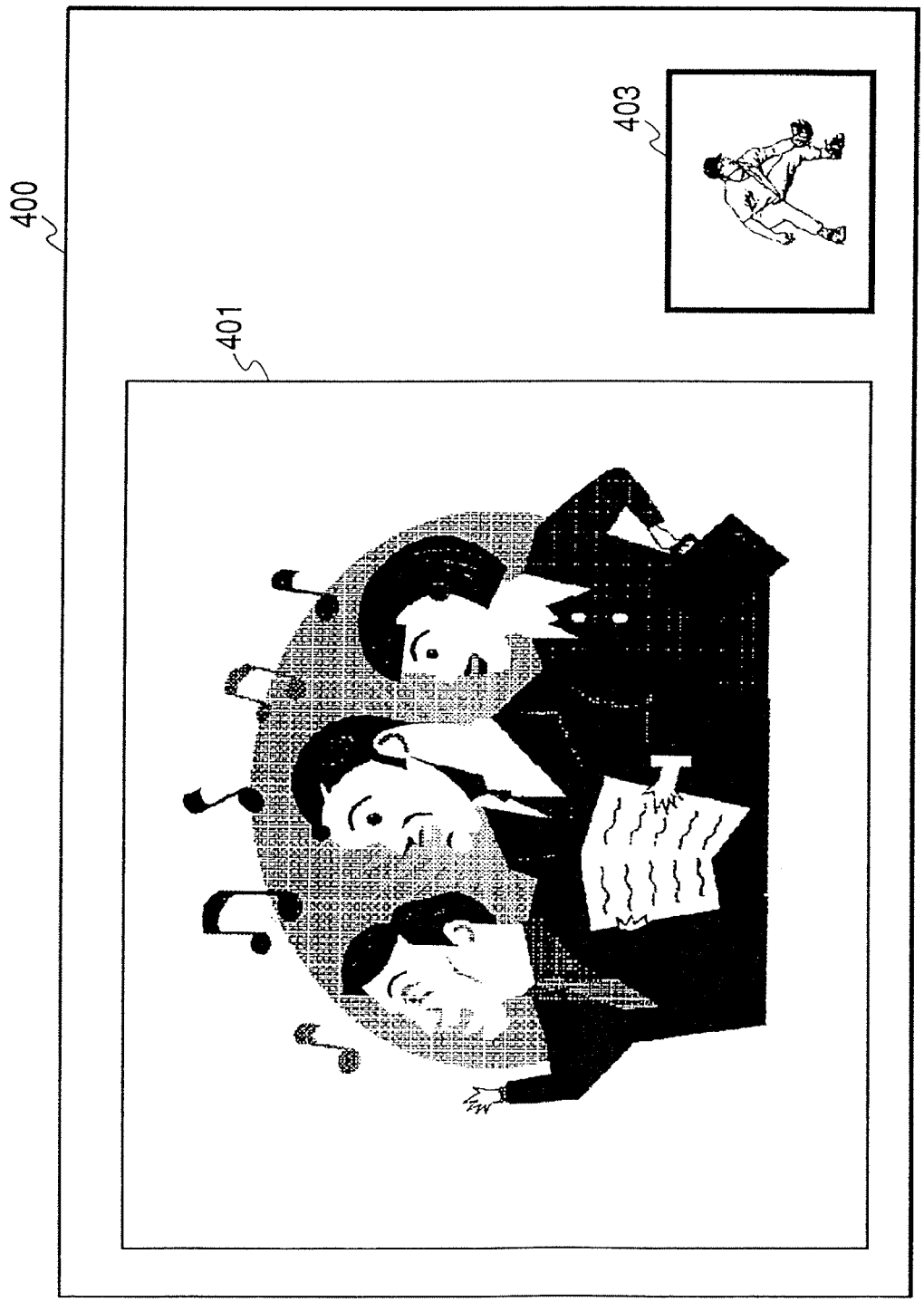
FIG. 5 is a diagram showing the display picture screen in the two-picture screen display mode.

In this case, when the control unit 115 detects an interesting scene according to the analysis result from the audio analysis unit 114, it controls the display control circuit 110 so as to display a frame as shown with reference numeral 403 in FIG. 5. Upon receipt of this instruction, the display control circuit 110 produces display screen data displaying the blinking frame 403 in the child picture screen 402 to output the same to the display unit 113.

In addition, in this embodiment, the case that two receiving sections are provided and images of programs received in these two receiving sections are displayed in a two-picture screen manner is explained, but the present invention is also applicable to a case that three or more receiving sections are provided and a program received in one of these receiving sections is displayed as a main picture screen program while three picture screens are simultaneously displayed like the above.

Incidentally, in this case, the audio analysis unit 114 analyzes audio data of plural channels of the child picture screen programs, and when any one of the states of audios coincides with the set condition, the audio analysis unit 114 outputs the audio of the corresponding child picture screen program.

Further, in this embodiment, one of the audios of the main picture screen program and the child picture screen program is selected and outputted by the audio output circuit 112 in the two-picture screen mode, but it is possible to change the output form of the audio of each program in accordance with the display state.

Figure 6:
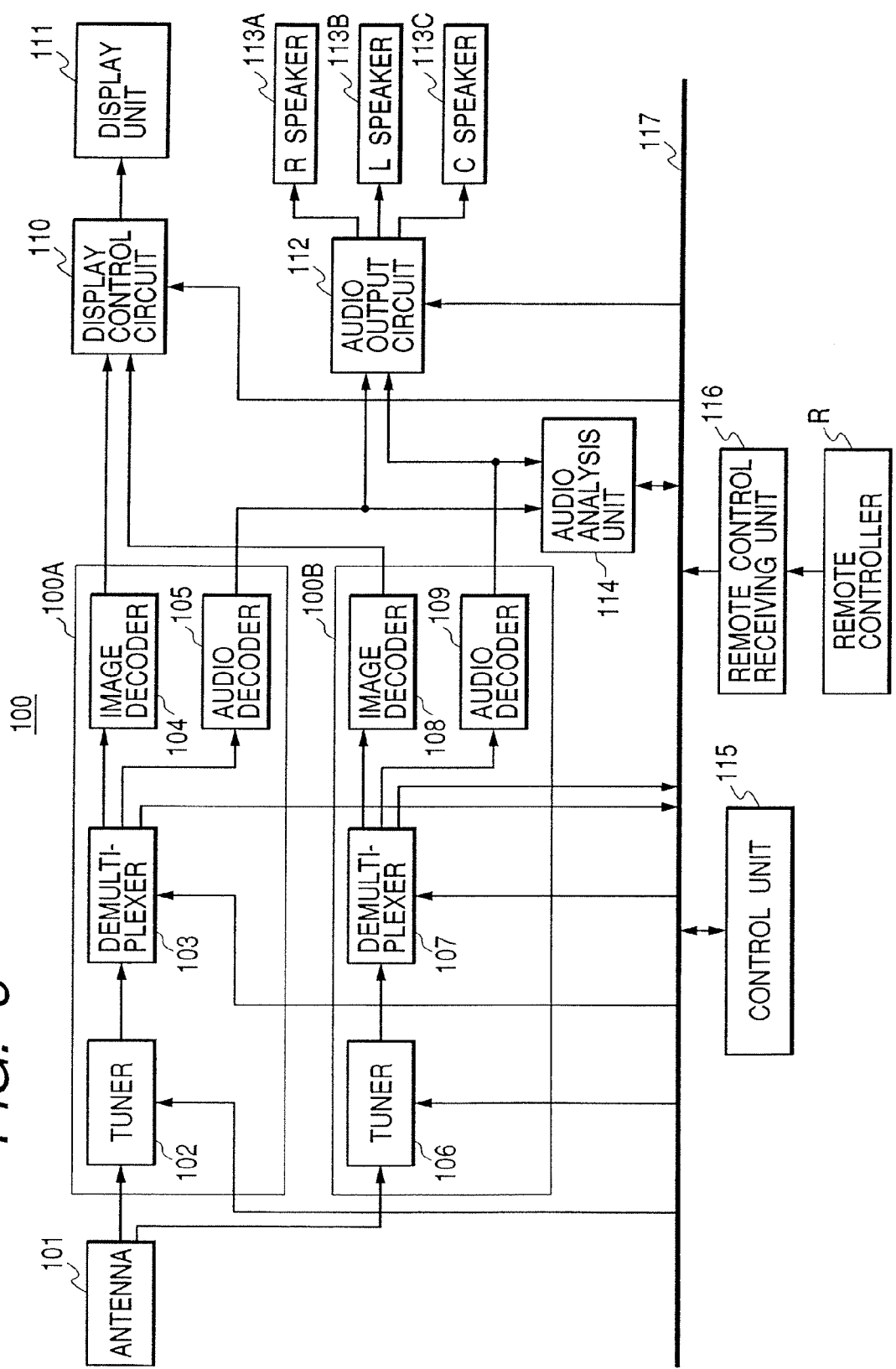
FIG. 6 is a block diagram showing another configuration of the television set to which the present invention is applied.

For example, as shown in FIG. 6, the speaker 113 is constituted with an R (right) speaker 113A, an L (left) speaker 113B and a C (center) speaker 113C, and such a configuration is employed that audios outputted to the respective speakers are switched according to a picture screen size at a time of a two-picture screen displaying.

Figure 7:
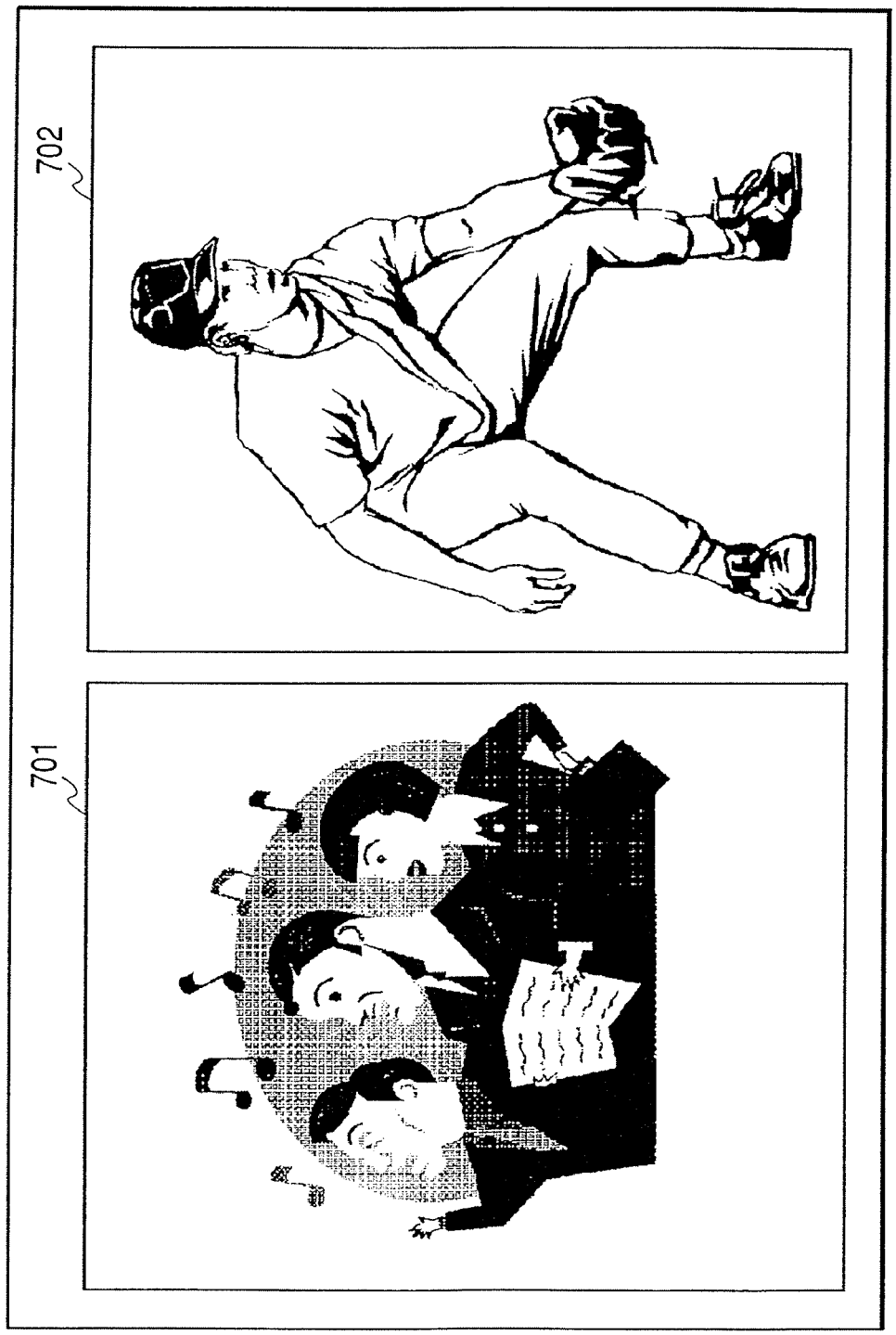
FIG. 7 is a diagram showing the display picture screen in the two-picture screen display mode.

In the television set shown in FIG. 6, as shown in FIG. 7, a mode for displaying two programs with the same size is provided as one of the two-picture screen modes in addition to the display mode of a parent-child picture screen as shown in FIG. 4.

In a case that displaying is made with the parent-child picture screen as shown in FIG. 4, the control unit 115 controls the audio output circuit 112 such that the R channel of the audio data of the program of the main picture screen 401 is outputted to the R speaker 113A and the L channel thereof is outputted to the L speaker 113B, and the audio data of the program of the child picture screen 402 is outputted to the C speaker 113C as monophonic audio. Further, such a control is made that the volume of the main picture screen program is made larger than that of the child picture screen program.

In such a situation, when the state of the audio of the program displayed on the child picture screen 402 coincides with the set condition, the control unit 115 controls the audio output circuit 112 so as to decrease the volume of the audios of the main picture screen program outputted from the R speaker 113A and the L speaker 113B and increase the volume of the child picture screen program outputted from the C speaker 113C.

On the other hand, in a case that an instruction to display two picture screens with the same size is issued from the remote controller R, as shown in FIG. 7, the control unit 115 controls the audio output circuit 112 so as to output the audio of the program of a left side picture screen 701 to the L speaker 113B as monaural audio and output the audio of the program of a right side picture screen 702 to the R speaker 113A as monophonic audio.

In this case, since such a setting is cancelled that one of the programs is the main picture screen and the other is the child picture screen, the control unit 115 stops inputting of the audio data into the audio analysis unit 114.

Many widely different embodiments of the present invention may be constructed without departing from the spirit and scope of the present invention. It should be understood that the present invention is not limited to the specific embodiments described in the specification, except as defined in the appended claims.

What is claimed is:

1. A television broadcast receiving apparatus comprising:
   a first receiving unit for receiving a television broadcast;
   a second receiving unit for receiving the television broadcast;
   an image output unit for producing main picture screen data for a main picture screen based on image data of a broadcast program received by said first receiving unit, producing sub picture screen data for a sub picture screen based on image data of a broadcast program received by said second receiving unit, and producing display picture screen data for a display picture screen comprising the main picture screen and the sub picture screen, and outputting the display picture screen data to a display device;
   an audio output unit for outputting at least one of audio data related to the main picture screen and audio data related to the sub picture screen to an audio device; and
   a control unit for controlling said audio output unit so as to change the ratio of the volume of the sound related to the main picture screen and the volume of the sound related to the sub picture screen, in accordance with the state of the sound related to the sub picture screen.

2. An apparatus according to claim 1, wherein said control unit controls said audio output unit so as to make the volume of the sound related to the sub picture screen larger than that of the sound related to the main picture screen when the state of the sound related to the sub picture screen satisfies a predetermined condition, and to make the volume of the sound related to the main picture screen larger than that of the sound related to the sub picture screen when the state does not satisfy the predetermined condition.

3. An apparatus according to claim 2, wherein the predetermined condition is whether a sound level of a predetermined audio kind set for each genre of the broadcast program exceeds a predetermined level.

4. A control method for a television broadcast receiving apparatus comprising:
   a receiving step for receiving a television broadcast;
   an image output step for producing main picture screen data for a main picture screen and sub picture screen data for a sub picture screen, each based on image data of a broadcast program received by said receiving step, and producing display picture screen data for a display picture screen comprising the main picture screen and the sub picture screen, and outputting the display picture screen data to a display device;
   an audio output step for outputting at least one of audio data related to the main picture screen and audio data related to the sub picture screen to an audio device; and
   a control step for changing the ratio of the volume of the sound related to the main picture screen and the volume of the sound related to the sub picture screen, in accordance with the state of the sound related to the sub picture screen.

* * * * *